United States Patent
Billman

(10) Patent No.: US 9,853,521 B2
(45) Date of Patent: Dec. 26, 2017

(54) ACTUATOR INCORPORATING A CASING HAVING A MOTOR MOUNTING STRUCTURE

(71) Applicant: Johnson Electric S.A., Murten (CH)

(72) Inventor: Christopher Joseph Billman, Springfield, TN (US)

(73) Assignee: Johnson Electric S.A., Murten (CH)

( * ) Notice: Subject to any disclaimer, the term of this patent is extended or adjusted under 35 U.S.C. 154(b) by 384 days.

(21) Appl. No.: 14/541,004

(22) Filed: Nov. 13, 2014

(65) Prior Publication Data

US 2015/0130301 A1 May 14, 2015

Related U.S. Application Data

(60) Provisional application No. 61/904,143, filed on Nov. 14, 2013.

(51) Int. Cl.
*H02K 5/04* (2006.01)
*H02K 5/24* (2006.01)
*H02K 7/116* (2006.01)

(52) U.S. Cl.
CPC ............. *H02K 5/24* (2013.01); *H02K 5/04* (2013.01); *H02K 7/116* (2013.01)

(58) Field of Classification Search
CPC ............ H02K 5/04; H02K 5/24; H02K 7/116
USPC .............................................. 310/50, 51, 89
IPC ................................................. H02K 5/04,5/24
See application file for complete search history.

(56) References Cited

U.S. PATENT DOCUMENTS

| | | | | |
|---|---|---|---|---|
| 5,839,320 A * | 11/1998 | Komachi | ................. | H02K 5/08 310/89 |
| 7,235,908 B2 * | 6/2007 | Shinmura | ............. | F16H 57/025 248/669 |
| 8,410,646 B2 * | 4/2013 | Mori | ........................ | H02K 5/24 248/632 |
| 2001/0032177 A1* | 10/2001 | Starkman | ............... | G06Q 40/02 705/38 |
| 2004/0032177 A1* | 2/2004 | Nitzsche | ................... | H02K 5/24 310/91 |
| 2006/0103260 A1* | 5/2006 | Ottolini | ................... | E05B 81/25 310/239 |
| 2014/0314598 A1* | 10/2014 | Le Goff | ................ | F04D 25/082 417/423.8 |
| 2015/0130301 A1* | 5/2015 | Billman | ................. | H02K 7/116 310/51 |

* cited by examiner

*Primary Examiner* — John K Kim
(74) *Attorney, Agent, or Firm* — Muncy, Geissler, Olds & Lowe, P.C.

(57) ABSTRACT

An actuator includes an electric motor having a shaft, an output member coupled to the shaft, a casing having a wall, a mounting structure, and a tubular body sleeved around the shaft and coupling the mounting structure to the wall. The motor is mounted to the casing via the mounting structure.

13 Claims, 5 Drawing Sheets

_US 9,853,521 B2_

ACTUATOR INCORPORATING A CASING HAVING A MOTOR MOUNTING STRUCTURE

CROSS REFERENCE TO RELATED APPLICATIONS

This non-provisional patent application claims priority under 35 U.S.C. §119(e) from Provisional Patent Application No. 61/904,143 filed in USA on Nov. 14, 2013, the entire contents of which are hereby incorporated by reference.

FIELD OF THE INVENTION

This invention generally relates to a casing for an electric motor and specifically to a casing having a motor mounting structure and an actuator incorporating such a casing.

BACKGROUND OF THE INVENTION

Many devices employ an actuator incorporating an electric motor. The motor is usually mounted in a casing of an actuator by a motor mount. In a known actuator, a bracket and screws are used to mount the motor in the casing. In another known actuator, two elastomeric dampers are disposed between the ends of the motor and the casing to isolate the casing from vibrations generated by the motor. Such motor mounts can reduce the audible noise level of the actuator. However, as the bracket and the dampers are separately formed from the casing, assembling steps are required in the manufacturing process and additional sources of failure may be introduced.

Thus, there is a desire for an improved actuator that can overcome the above described shortcomings. Specifically, there is a desire for a low noise actuator with few components, reliable performance, and a simple manufacturing process.

SUMMARY OF THE INVENTION

Accordingly, in one aspect thereof, the present invention provides an actuator, comprising: a motor having a shaft; an output member coupled to the shaft; and a casing accommodating the motor and having a first casing part and a second casing part, the first casing part comprising a base and a mounting structure for mounting the motor to the casing, wherein the mounting structure is fixed to a first edge portion of the base by a connecting structure such that the mounting structure is cantilevered above the base.

Preferably, the connecting structure connects the mounting structure to the first edge portion of the base via a wall extending along the first edge portion of the base.

Preferably, the mounting structure comprises an abutment plate and a sleeve extending from the abutment plate, the motor being a press fit in the sleeve with an end plate of the motor abutting the abutment plate and the shaft extending through the abutment plate.

Preferably, the connecting structure extends from a side of the abutment plate remote from the sleeve.

Preferably, the sleeve has a free end and a supporting rib connects the free end of the sleeve to a second edge portion of the base.

Preferably, the connecting structure comprises a tubular body sleeved around the shaft of the motor, and the tubular body has a window formed in a circumferential surface thereof.

Preferably, an interlock structure is formed between the second casing part and the tubular body.

Preferably, the motor comprises a housing having a cut-out formed therein; and the second casing part comprises a projection engaged with the cut-out in the housing.

Preferably, the first casing part, connecting structure and mounting structure are integrally formed as a single monolithic structure.

Preferably, at least one opening is formed in the circumferential surface of the sleeve.

Preferably, the abutment plate comprises a non-flat abutment surface axially contacting the motor; and the sleeve extends in the axial direction of the motor from the abutment surface.

Preferably, the abutment surface has a V-shaped rib, and the motor contacts the abutment surface only at the tip of the V-shaped rib.

Preferably, the tubular body and the mounting structure are integrally formed as a monolithic structure.

Preferably, the tubular body and the mounting structure are separately formed and assembled to each other.

Preferably, the sleeve has a continuous circumferential surface.

In a second aspect thereof, the present invention provides a casing for an actuator, comprising: a wall; a mounting structure for mounting a motor having a shaft to the casing; and a damper disposed between the mounting structure and the wall, the damper integrally extending from the wall such that the damper and the wall form a monolithic member.

Preferably, the damper comprises a tubular body for sleeving the shaft of the motor.

Preferably, the tubular body extends from the wall in an axial direction of the motor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE VARIOUS EMBODIMENTS

Figure 1:
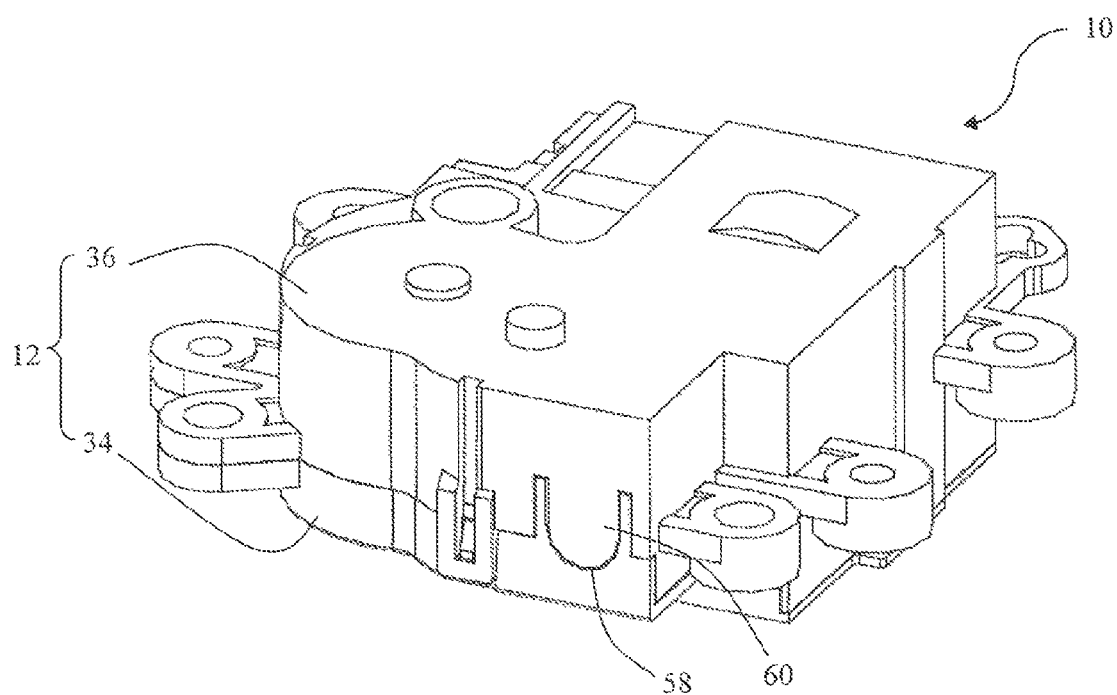
FIG. 1 illustrates an actuator incorporating a casing in accordance with a preferred embodiment of the present invention.
Figure 2:
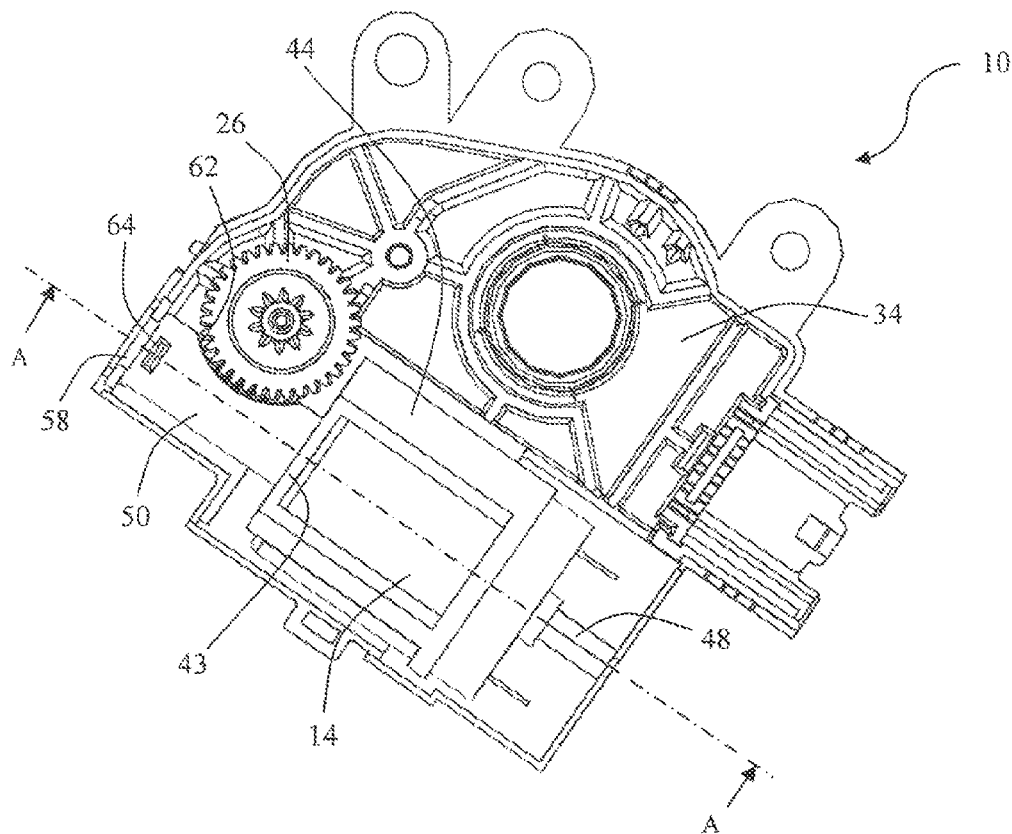
FIG. 2 is a partial plan view of the actuator of FIG. 1.
Figure 3:
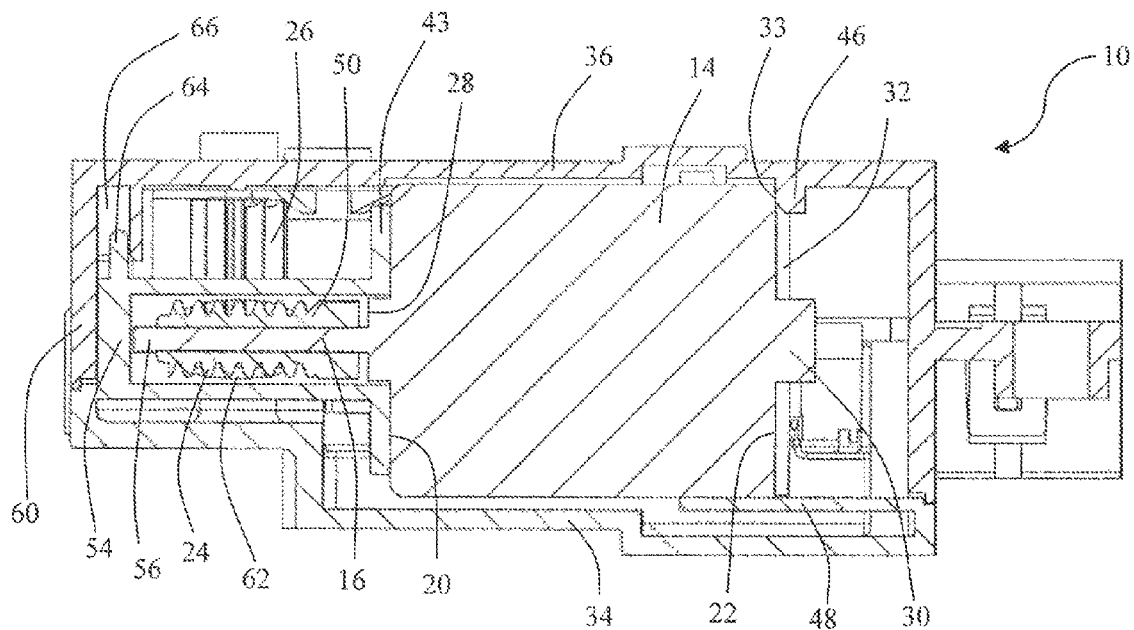
FIG. 3 is a sectional view of the actuator shown in FIG. 1, taken along line A-A shown in FIG. 2.

FIG. 1 illustrates an actuator 10 incorporating a casing 12 in accordance with a preferred embodiment of the present invention. FIG. 2 is a partial plan view of the actuator 10. FIG. 3 is a sectional view of the actuator 10 taken along line A-A in FIG. 2. By way of example, the actuator 10 is suitable for such applications as those used in the HVAC system of a vehicle. The actuator 10 comprises the casing 12, an electric motor 14, and a gear transmission (not shown) for transmitting the rotation of the motor 14 to an output member (not shown). The motor 14, the gear transmission, and the output member are received in the casing 12.

Figure 4:
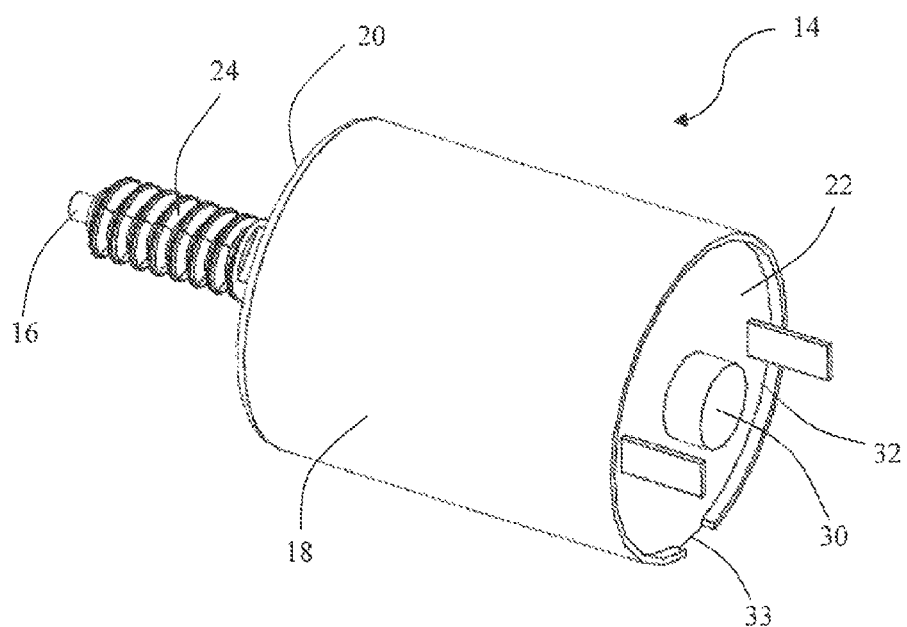
FIG. 4 illustrates a motor, being a part of the actuator of FIG. 1.

Also referring to FIG. 4, the motor 14 is preferably a DC motor and comprises a shaft 16 and a housing 18 with two flat end plates 20 and 22 that are substantially perpendicular to the shaft 16. A worm 24 is provided on the shaft 16. The gear transmission comprises a worm wheel 26 (shown in FIG. 3) engaged with the worm 24. To clearly show the structure of the casing 12, the output member and other components of the gear transmission are not shown in the figures. Two cylindrical bosses 28 and 30 protrude axially from the end plates 20 and 22, respectively, and accommodate bearings for supporting the shaft 16. A flange 32 extends axially from the end plate 22 of the housing 18 remote from the worm 24. A cut-out 33 is formed in the flange 32.

Figure 5:
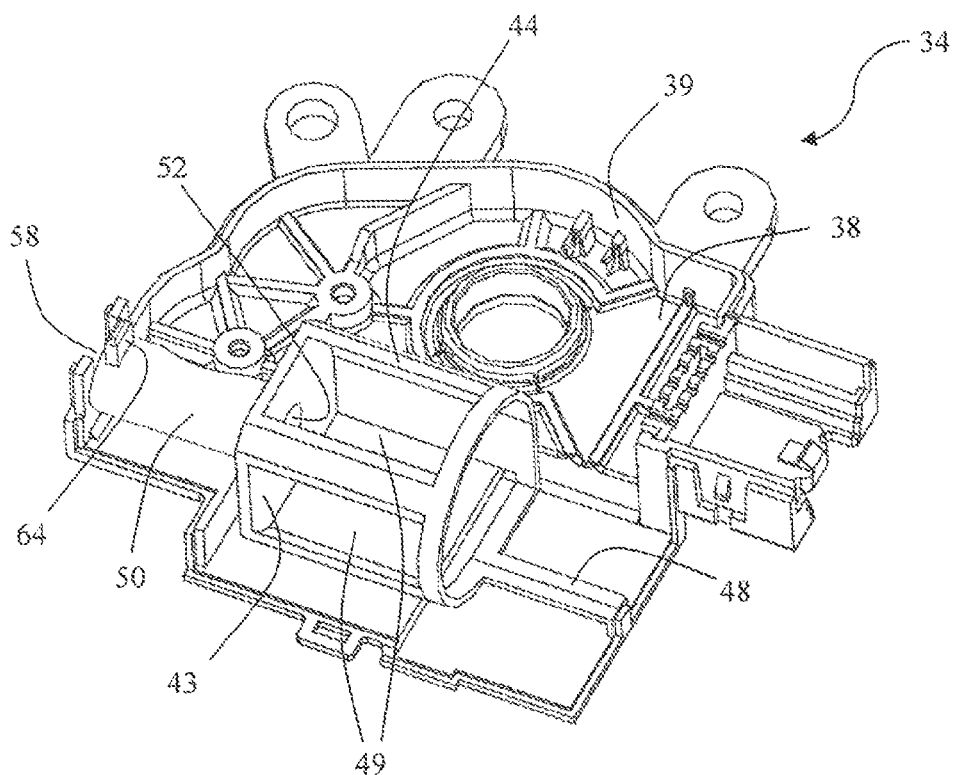
FIG. 5 illustrates a first casing part of the casing shown in FIG. 1.
Figure 6:
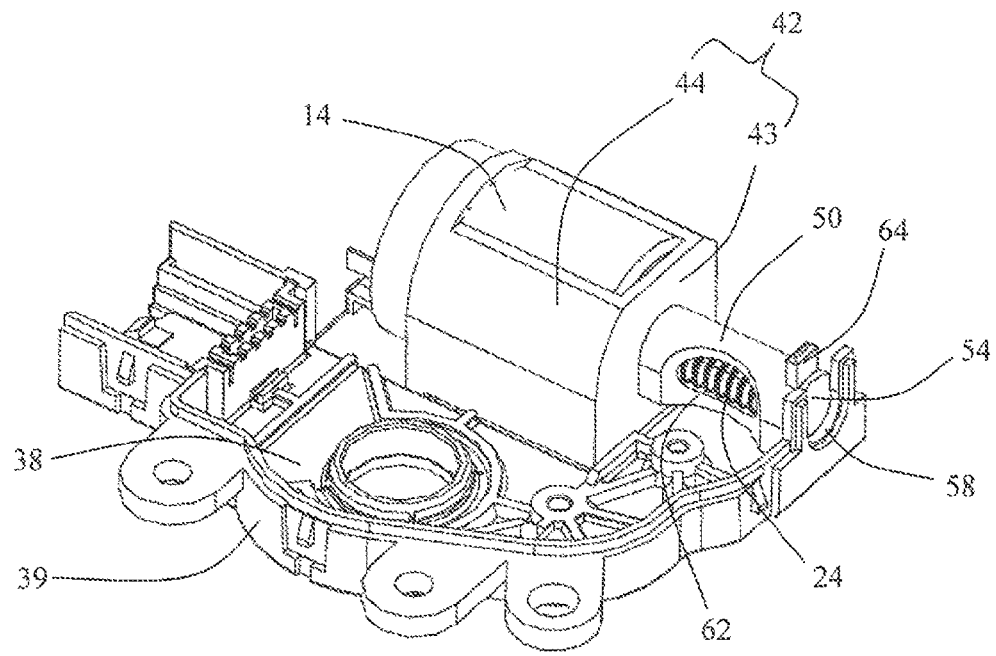
FIG. 6 illustrates the first casing part of FIG. 5, viewed from a different angle.
Figure 7:
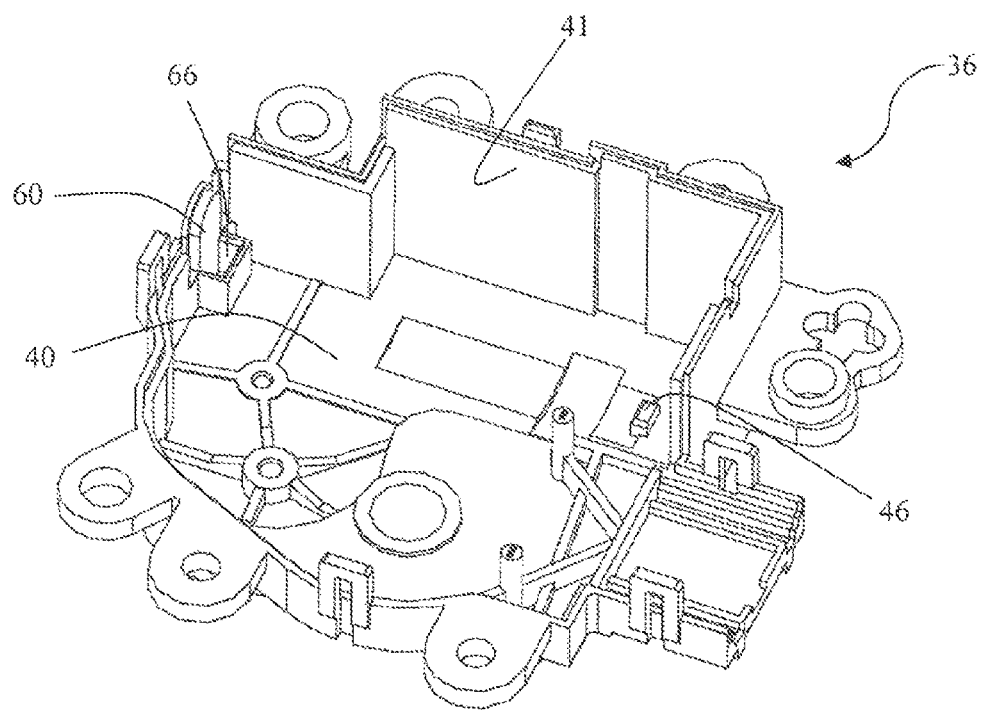
FIG. 7 illustrates a second casing part of the casing of FIG. 1.

In accordance with the preferred embodiment, the casing 12 is made of plastic, e.g., polypropylene, and includes a first casing part 34 and a second casing part 36 coupled to each other. FIGS. 5 and 6 illustrate the first casing part 34 viewed from different angles. FIG. 7 illustrates the second casing part 36. The first casing part 34 includes a first base 38 and a first side wall 39. The second casing part 36 includes a second base 40 and a second side wall 41. The motor 14 is mounted to the casing 12 via a mounting structure 42. Preferably, the mounting structure 42 and the first casing part 34 are integrally formed as a monolithic structure, i.e. it may be a single piece injection molding. The mounting structure 42 comprises an abutment plate 43 and a sleeve 44 axially extending from the abutment plate 43.

The first casing part 34 of the casing 12 also includes connecting structure, optionally in the form of a tubular body 50, between the abutment plate 43 and the side wall 39 for coupling the mounting structure 42 to the side wall 39 of the casing 12. The connecting structure preferably functions as a damper to reduce the transmission of vibrations from the motor to the casing. Preferably, the tubular body 50, the abutment plate 43, and the side wall 39 are integrally formed as a monolithic structure. A through hole 52 is formed in the abutment plate 43. The axial end of the tubular body 50 remote from the abutment plate 43 is closed by an end wall 54 extending from the side wall 39.

As can be seen in FIG. 3, the sleeve 44 is spaced from the first base 38 to prevent or mitigate motor vibrations being transferred to the first base. The connecting structure fixes the mounting structure to an edge portion of the first base in a cantilever manner, such that the mounting structure is suspended above the first base. Preferably, the connecting structure is fixed to the edge portion by a wall that extends from the edge portion, although it could be directly connected. The optional rib 48 braces the free end of the sleeve to a second edge portion of the first base, directly or via a portion of a wall.

Optionally, a rib 48 is formed on the first casing part 34 and supports the free end of the sleeve 44. In this embodiment, several openings 49 are formed in the circumferential surface of the sleeve 44 so that the entire circumferential surface of the sleeve 44 is not a continuous surface. By this configuration, material usage for the mounting structure 42 is reduced.

The motor 14 is inserted into the sleeve 44 and mounted to the sleeve 44 in a tight manner such as by an interference fit or press fit. The end plate 20 of the housing 18 of the motor 14 abuts against the abutment plate 43. The flange 32 of the housing 18 abuts against a locking member 46 formed on the second base 40 of the second casing part 36. Thus, the housing 18 of the motor 14 is axially positioned between the abutment plate 43 and the locking member 46. The locking member 46 locates in a cut-out 33 formed in an edge of the motor housing 18, forming an interlock mechanism to prevent the motor from turning within the sleeve 44. The motor shaft 16 extends into the tubular body 50 via the through hole 52. The tubular body 50 is sleeved around the worm 24 on the shaft 16 without contacting the worm so that the shaft 16 can rotate freely within the tubular body 50. The free end 56 of the shaft 16 reaches and is axially supported by the end wall 54. The flat end plate 20 of the housing 18 of the motor 14 abuts against the axial abutment plate 43 of the casing 12. The boss 28 extending from the end plate 20 extends into and is radially supported by the tubular body 50.

A notch 58 is formed in the side wall 39 outside the end wall 54 of the tubular body 50 of the first casing part 34, and a corresponding ridge 60 is formed on the side wall 41 of the second casing part 36 of casing 12. The notch 58 and the ridge 60 engage with each other to circumferentially position the second casing part 36 relative to the first casing part 34. Furthermore, the end wall 54 of the tubular body 50 and the side walls 39 and 41 of the casing 12 provide a stiff support for the tubular body 50, which is beneficial in diminishing the noise and/or vibration of the casing 12 while the motor 14 is in operation. A window 62 is formed in the circumferential surface of the tubular body 50 so that the worm 24 on the shaft 16 is exposed and engaged with the worm wheel 26.

Preferably, a projection 64 extends from the outer surface of the tubular body 50 in the first casing part 34 and a corresponding slot 66 is formed in the second casing part 36. When the first casing part 34 and the second casing part 36 are assembled together, the projection 64 is engaged with the slot 66 to form an interlock structure, thereby reducing or substantially eliminating the tipping of the mounting structure 42 during the operation of the motor 14.

Figure 8:
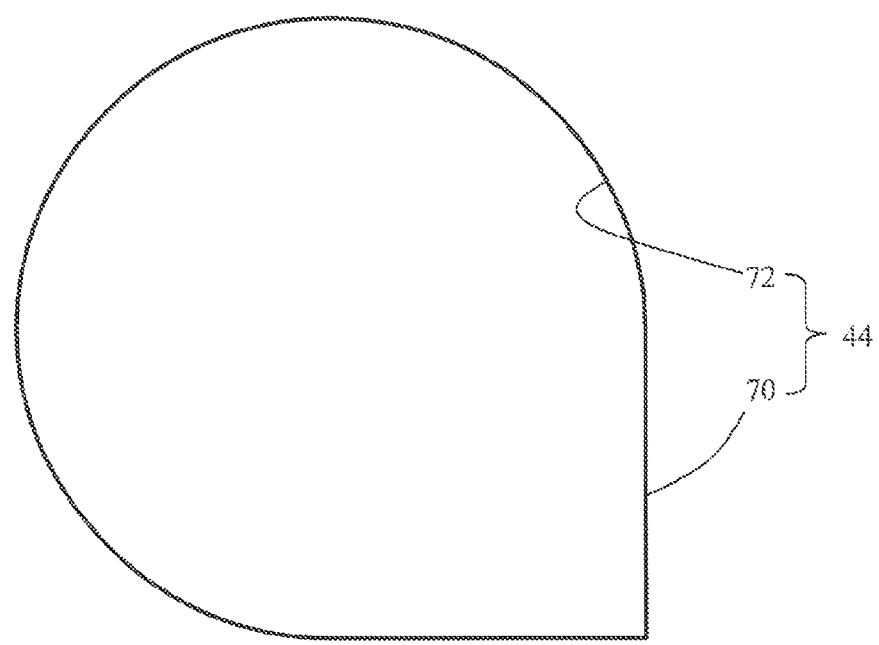
FIG. 8 illustrates a sleeve being a part of the casing in accordance with another embodiment of the present invention.

In accordance with another embodiment of the present invention as illustrated in FIG. 8, the sleeve 44 of the mounting structure 42 has no opening formed in the circumferential surface thereof, so that the entire circumferential surface of the sleeve 44 is a continuous surface. The sleeve 44 has an L-shaped portion 70 integrally extending from the base 38 of the first casing part 34 and an arcuate portion 72 connecting two circumferential ends of the L-shaped portion 70. The motor 14 is mounted to the sleeve 44 by an interference fit. Alternatively, the sleeve 44 may be rectangular in shape.

In accordance with an embodiment of the present invention, the tubular body 50 and the mounting structure 42 may be separately formed and assembled to each other.

Figure 9:
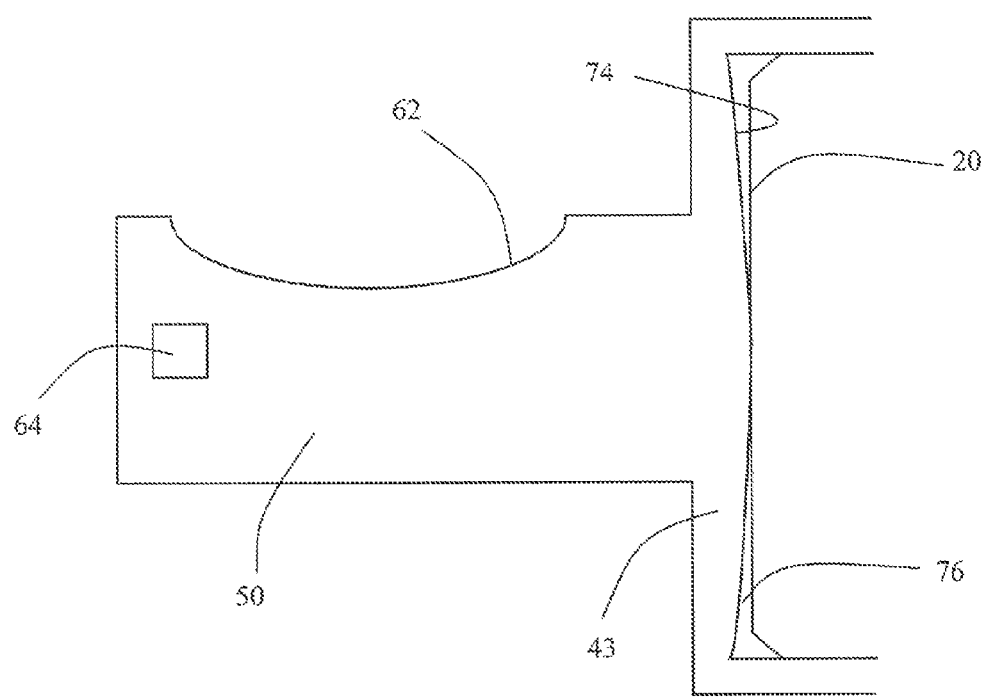
FIG. 9 illustrates an actuator in accordance with yet another embodiment of the present invention.

In accordance with yet another embodiment, as illustrated in FIG. 9, the inner surface 74 of the abutment plate 43 of the mounting structure 42 facing the motor 14 is a convex surface so that gaps 76 are formed between the end plate 20 of the motor 14 and portions of the surface 74 remote from the shaft 16. As the contact area between the abutment plate 43 and the end plate 20 is reduced, less vibration is transmitted from the motor 14 to the casing 12 of the actuator 10.

Figure 10:
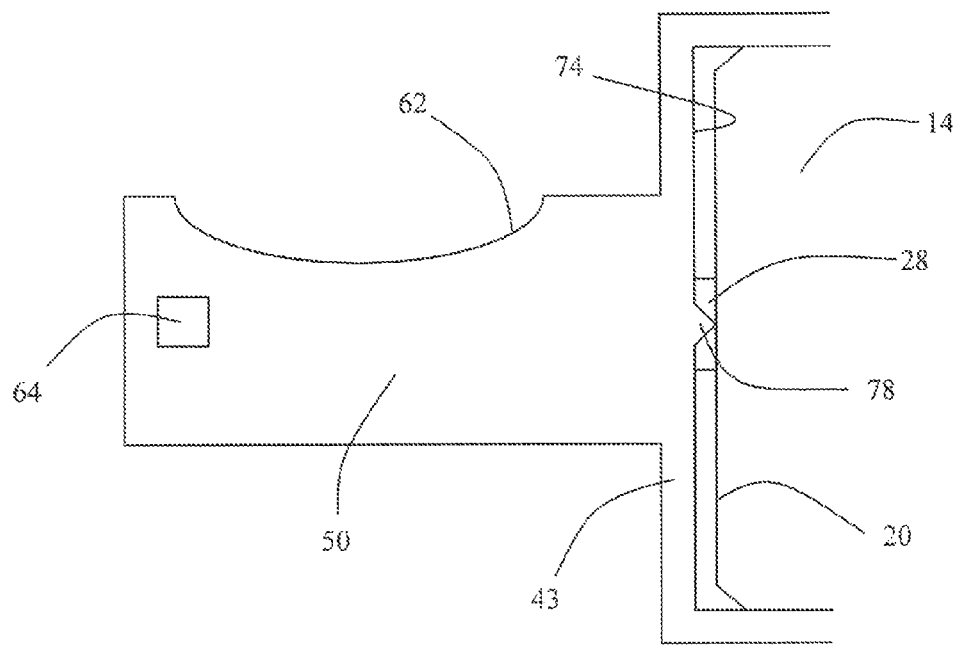
FIG. 10 illustrates an actuator in accordance with a further embodiment of the present invention.

In accordance with a further embodiment as illustrated in FIG. 10, the inner surface 74, which is also referred to as abutment surface, of the abutment plate 43 on the mounting structure 42 is a flat surface with a V-shaped rib 78 extending therefrom. The end plate 20 of the motor 14 contacts the abutment plate 43 only at the tip of the V-shaped rib 78, which reduces the contact area between the abutment plate 43 and the end plate 20. Thus, less vibrations generated by the motor 14 are transmitted to the casing 12.

In accordance with a preferred embodiment of the present invention, the tubular body 50 is made of a filled polypropylene and is arranged to link the mounting structure 42 to the side wall 39 of the casing 12. The tubular body 50 acts as a damper to reduce the amount of motor vibration transmitted to the casing 12. The mounting structure 42, the tubular body 50 and the rest of the first casing 34 can be formed as a monolithic structure. Therefore, the manufacturing process is simple, the cost of the actuator is reduced, and the reliability is improved.

In the description and claims of the present application, each of the verbs "comprise", "include", "contain" and "have", and variations thereof, are used in an inclusive sense, to specify the presence of the stated item or feature but do not preclude the presence of additional items or features.

It is to be appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to one or more preferred embodiments, it should be appreciated by those skilled in the art that various modifications are possible. Therefore, the scope of the invention is to be determined by reference to the claims that follow.

For example, the inner surface 74 of the abutment plate 43 may be other shapes, such as concave, convex, wavy or bumpy, as long as the contact area is reduced to diminish the transmission of vibrations. Also, the damper may take a form other than tubular.

The invention claimed is:

1. An actuator, comprising:
a motor having a shaft;
an output member coupled to the shaft; and
a casing accommodating the motor and having a first casing part and a second casing part, the first casing part comprising a base and a mounting structure for mounting the motor to the casing,
wherein the mounting structure is fixed to a first edge portion of the base by a connecting structure such that the mounting structure is cantilevered above the base;
wherein the mounting structure comprises an abutment plate and a sleeve extending from the abutment plate, the motor being a press fit in the sleeve with an end plate of the motor abutting the abutment plate and the shaft extending through the abutment plate.

2. The actuator of claim 1, wherein the connecting structure extends from a side of the abutment plate remote from the sleeve.

3. The actuator of claim 1, wherein the sleeve has a free end and a supporting rib connects the free end of the sleeve to a second edge portion of the base.

4. The actuator of claim 1, wherein the connecting structure comprises a tubular body sleeved around the shaft of the motor, and
the tubular body has a window formed in a circumferential surface thereof.

5. The actuator of claim 4, further comprising an interlock structure formed between the second casing part and the tubular body.

6. The actuator of claim 1, wherein the motor comprises a housing having a cut-out formed therein; and
the second casing part comprises a projection engaged with the cut-out in the housing.

7. The actuator of claim 1, wherein the first casing part, connecting structure and mounting structure are integrally formed as a single monolithic structure.

8. The actuator of claim 1, wherein at least one opening is formed in the circumferential surface of the sleeve.

9. The actuator of claim 1, wherein the abutment plate comprises a non-flat abutment surface axially contacting the motor; and
the sleeve extends in the axial direction of the motor from the abutment surface.

10. The actuator of claim 1, wherein the abutment surface has a V-shaped rib, and
the motor contacts the abutment surface only at the tip of the V-shaped rib.

11. The actuator of claim 4, wherein the tubular body and the mounting structure are integrally formed as a monolithic structure.

12. The actuator of claim 4, wherein the tubular body and the mounting structure are separately formed and assembled to each other.

13. The actuator of claim 4, wherein the sleeve has a continuous circumferential surface.

* * * * *